United States Patent Office 3,388,088
Patented June 11, 1968

3,388,088
FLEXIBLE POLYMER FILM FORMING COMPOSITIONS
Paul R. Graham and August F. Ottinger, St. Louis, Mo., assignors to Monsanto Company, St. Louis, Mo., a corporation of Delaware
No Drawing. Filed Dec. 7, 1965, Ser. No. 512,214
6 Claims. (Cl. 260—32.6)

ABSTRACT OF THE DISCLOSURE

This invention relates to flexible polymer film forming compositions comprising (1) a polymer of polymerizable vinyl compounds and a polycarboxylic acid, (2) a deliquescent plasticizer and (3) a hydratable compound.

---

This invention relates to water dispersible, polymer compositions and formulations of interpolymers of polymerizable vinyl compounds and dicarboxylic acid anhydrides having ethylenic unsaturation. It also relates to dry free-flowing solid formulations and compositions of said polymers and to films and coated products made therefrom.

It is known that certain copolymers of polymerizable vinyl compounds and alpha,beta-olefinically unsaturated polycarboxylic acids or anhydrides thereof such as styrene/maleic copolymers are soluble in water in the salt form, such as in the ammonium salt form, and that the dissolved polymer solution of such polymer can be spread on a suitable substrate surface to form a film of polymer which when dried has good solvent, wax, oil and water holdout properties.

However, such dried polymer films are brittle, and are particularly not suitable for various industrial applications such as when applied to paper webs and paper boards which are thereafter calendered, and used in making reproduction papers, or creased, crumbled or bent into suitable form for use as (a) packaging material. When subjected to such physical treatment these films, either as the polymer film alone or as a coating or as an impregnating resin applied to a suitable cellulosic substrate fail to pass flexibility and compressibility tests and fail holdout property tests required of (b) good organic solvent, wax or oil type holdout papers.

An object of this invention is to provide an economical polymer composition which can be handled in dry as well as in solution form to make polymer films therefrom having improved flexibility and compressibility characteristics and which can be subjected to various industrial pressing, bending, and creasing operations and still maintain itself as a continuous film or web so as to properly function as a holdout coating or impregnant.

A further object is to provide a dry polymer formulation which can be easily packaged, transported, and then readily dispersed in aqueous media for making films and coatings, therefrom.

A further object is to provide a method for forming, flexible polymer film forming compositions which have improved resistance to rupture or cracking caused by applied pressure in the form of calender rolls, as well as bending, creasing, and crumbling operations.

A further object of this invention is to provide paper webs and paper board coated and impregnated with polymer films which have increased flexibility and compressibility properties.

Other objects, advantages, and aspects of this inventions will appear as the description of this invention proceeds.

The several aspects and objects of the invention may be described, briefly, as involving a combination of (1) a polymer of a polymerizable vinyl compound monomer and an olefinically unsaturated mono-, di-, or tricarboxylic acid anhydride or a salt, amide, imide, amide-salt or ester derivative thereof in major proportion, and minor proportions, relative to the amount of the polymer, of (2) a deliquescent plasticizer such as urea, melamine, or derivatives thereof etc. and (3) a hydratable compound. The three components may be blended in suitable proportions in a dry, solid form and packaged and transported as such or the three components may be mixed dry or in solution form. The solution of the three ingredients, which is preferably aqueous, can be spread on a suitable surface and dried to form a film of flexible polymer or the solution can be applied to a suitable substrate such as paper, wood, cloth, or metal to effect a coating or impregnation thereof with the polymer solution. Upon evaporating the water therefrom there remains a coated or impregnated article having a flexible continuous coating or web of polymer which may be subjected to various handling operations.

A preferred example of a dry polymer composition of this invention is one which contains a major proportion of a styrene/maleic anhydride copolymer, from 10 to 30 parts of urea, based on 100 parts of the polymer, and from 5 to about 20 parts, based on 100 parts of urea, of a hydratable salt such as magnesium chloride.

These compositions may be dispersed in water with the aid of a basic material, if the polymer is the anhydride, to any desired concentration. For film forming applications it may be desired to form aqueous compositions containing from 20 to 50 weight percent of the total dry solids three component polymer composition. When the polymer composition is to be applied to a paper web or sheet or a paper board aqueous solutions of from 5 to about 20 weight percent, based on the total solution, are preferred. However, aqueous polymer dispersions containing from about 0.5 to about 50% by weight of these compositions are useful for various applications.

In addition to using the compositions in dispersed form mixed with water or other easily volatilized solvent such as lower alkanols, e.g. methanol, ethanol, propanol, butanol or hydrocarbons such as pentanes, hexanes, ether-alcohols such as methoxycarbitol, butoxyethanol, etc., either alone or mixed with water, the compositions may also be used as modifiers for starch and modified starch materials which have wide utility in various industrial applications, but particularly in paper surface-size applications.

The interpolymers employed in the compositions of this invention may be prepared from a variety of one or more vinyl compounds and dicarboxylic or tricarboxylic acid anhydrides in a variety of ways. The term "vinyl compound" as used herein as describing a moiety of the interpolymer component of the compositions of this invention is intended to include any polymerizable compound having a

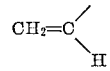

group and containing not more than about 20 carbon atoms. Included are the aliphatic and aromatic alpha-olefin hydrocarbons such as the alkenes, e.g., ethylene, propylene, branched and straight chained butenes, hexenes, such as 3-methyl-1-pentene, and isomers thereof, 1-hexene, 1-octene, 1-nonene, 1-decene, tridecene, octadecene, etc., and monocyclic aromatic hydrocarbon alpha-olefins such as styrene, m- and p-vinyltoluene, and mixtures thereof, p-chlorostyrene, as well as lower alkenyl esters of alkanoic and alkenoic acids such as vinyl acetate, allyl propionate, vinyl and allyl esters of acids such as decanoic, dodecanoic, tridecanoic, tetradecanoic, hexadecanoic, hetadecanoic, heptadecanoic, heptadecandienoic acid formed synthetically or derived from naturally occurring oils such as linseed oil, cottonseed oil, castor oil, olive oil, safflower oil, palm oil, coconut oil, soybean oil, which are designated as glyceride oils, and the fatty acids found in such nonglyceride sources as tall oil and the like; the alkyl vinyl ethers such as the methyl, propyl, pentyl, hexyl, octyl, decyl, tridecyl, hexadecyl, and octadecyl vinyl ethers as well as higher alkenyl vinyl ethers such as tridecenyl vinyl ether, hetadecenyl vinyl ether, and other vinyl compounds described for example in Voss Patent 2,047,398. A preferred class of vinyl compounds are those having the structural formula $$R-CH=CH_2$$

where R is phenyl or a methyl- or chloro-substituted phenyl radical or a straight or branched alkyl group having from 4 to about 12 carbon atoms such as hexene, octene, decene, dodecene, tetradecene. Styrene is the preferred vinyl compound because of its availability and low cost and because it polymerizes easily with dicarboxylic anhydrides such as maleic anhydride to form low color interpolymers which are obtainable in dry, solid form and which are soluble in a relatively large variety of organic liquids.

Vinyl compounds such as acrylonitrile, acrylic acid, methacrylic acid, and alkyl acrylates and methacrylates such as ethyl acrylate, methyl methacrylate, vinyl chloride, vinyl alcohol, vinyl ether derivatives such as decyl vinyl ether and vinylidene compounds such as vinylidene chloride may be used in the interpolymerization to replace a part of the above described vinyl compounds and to modify the properties of the interpolymer product prepared from the above described vinyl compounds.

Polycarboxylic anhydrides as used herein refers to anhydrides of di- and tricarboxylic acids having from 4 to 8 carbon atoms. Examples of such anhydride monomers which may be used include maleic anhydride, chloromaleic anhydride, citraconic anhydride, itaconic anhydride, aconitic anhydride, and the like. Such polycarboxylic anhydrides may contain substituent groups such as halides, alkyl groups and the like and at least 4 but not more than 8 carbon atoms. However, they should not contain reactive substituent groups such as sulfonic acid, nitrile, or other reactive groups. Small amounts of polymerizable acids such as maleic acid, fumaric acid, citraconic acid, itaconic acid, and alkyl half esters of such acids such as methyl acid maleate, ethyl acid fumarate, or acrylic acid, or methyl methacrylates may be used with the anhydrides. Of course mixtures of anhydrides can be used. Maleic anhydride is preferred because of low cost and ready availability, and because it gives with styrene a good film forming polymer having many desirable properties.

The interpolymers employed in this invention are suitably prepared by a variety of well known methods. The procedures can be adapted to prepare the interpolymers having molecular weights ranging from about 25,000 to about 200,000 depending upon the vinyl monomers used. The interpolymers used usually are prepared so as to contain essentially equimolar proportions of the vinyl compound and the polycarboxylic anhydride. However, interpolymers in which the molar ratio of the dicarboxylic anhydride to the vinyl compounds is from about 0.90:1 to about 1.8:1 can be utilized. The better interpolymers are prepared so as to have substantially alternating polycarboxylic anhydride-vinyl compound moieties. The interpolymers are prepared with or without solvents such as benzene or xylene and using catalysts such as azobis(isobutyronitrile), di-tert-butyl peroxide, tert-butyl perbenzoate, or any initiator which will be effective at from about 50°–150° C. such as isopropyl peroxydicarbonate, tetrachlorobenzoyl peroxide and the like. Molecules of excessive size introduce operational difficulties such as a rapidly increasing tendency to gel, reduced ease of application, and the like, and therefore for most combinations of monomers and applications it is preferred that the molecular weight of the interpolymer be below about 150,000. However, in some applications higher M.W. would be desirable. The interpolymer product is usually obtained as a viscous liquid at the temperature of reaction which upon cooling solidifies to a glassy solid which is easily broken up into particles of suitable size. If desired the polymer containing anhydride groups therein may be treated with a base to form salts thereof, preferably an alkali metal or alkaline earth metal base such as sodium hydroxide, potassium hydroxide, calcium hydroxide, etc. or with ammonia, or ammonium hydroxide to effect formation of the water soluble salt or half-amide half-ammonium salt form of the copolymer. If desired the coplymer may also be treated with alkonals such as methanol, butanol, or the higher alkanols such as octanol, decanol, dodecanol, tetradecanol, octadecanol, as well as mixed alcohols, e.g., a mixture of alkanols having an average of from about 14 to 18 carbon atoms per molecule, to effect at least partial esterification of the carboxyl group content of these copolymers. The copolymer in any of these forms may be used as a component of the composition of this invention.

Urea is preferred as deliquescent plasticizer of the composition of this invention because of its substantial solubility in water at most temperatures. However, melamine or its derivatives may readily be used by dissolving the composition containing it in warm or hot water before forming a film or applying it in a cellulosic substrate.

The preferred urea component may be used in admixture with or may be replaced by one or more urea derivatives or related deliquescent compounds which serve the same function of softening the vinyl compound/polycarboxylic anhydride polymer film or coating. Thus, the term "urea" as used herein is intended to include urea dimers and trimers such as biuret and triuret, urea salts such as urea nitrate, urea phosphate, urea peroxide, urea oxalate, urea calcium chloride (afenil), organic group substituted ureas such as dialkylurea, e.g. dimethyl urea, diethylurea, diarylureas such as diphenylurea, ditolylurea, dicycloalkylureas such as dicychlohexylurea as well as the melmaine type of triazine compounds including monomeric melamine, melan, melem, dicyandiamide, dicyandiamidine, etc. Commercial mixtures of various triazines or mixtures of various triazines with other amino compounds may be used. An example of a commercial mixture which may be used is the product obtained by heating dicyandiamide sufficiently to obtain a significant amount of melamine therein together with other amino compounds.

The hydratable compound used as component 3 of the compositions of this invention is one which already has or one which will take up water of hydration when placed in an aqueous environment and which will retain at least a portion of the water of hydration when the polymer composition containing it is spread as a film or is part of a coating composition. For reasons of economy the preferred hydratable compounds used in this invention are hydratable salts of an anion derived from an inorganic acid and a cation derived from an alkali metal or alkaline earth metal base. It is to be understood, however, that the used hydratable compound in this invention is not limited to inorganic salts, but may also include other hydratable compounds such as hydratable inorganic bases such as potassium hydroxide, lithium oxide, sodium hydroxide, etc. salts of organic acids such as potassium and sodium salts of citric, acetic, tartaric, benzonic acids, etc. Any particular hydratable compound chosen for use in these compositions will depend upon the use intended for the polymer composition product, the method by which the components are compounded, and the economics involved. Although any alkali or alkaline earth metal salt (including magnesium) of an inorganic acid may be used, as a practical matter only the more economical salts are used. Thus, the sodium and potassium, ammonium, calcium and magnesium salts, either alone or mixed salts of inorganic acids of chlorine such as hydrochloric and chloridic acids, of sulfur such as sulfuric, sulfurous, sulfonic, etc. of phosphorus such as phosphoric, phosphonic, phosphinic, phosphorous, phosphonous, phosphinous, of boron such as boric, boronic, borinic acids, as well as hydratable salts of silicon and selenium acids may be used. Generally, any salt or base of an inorganic cation and an inorganic or organic anion which can exist in the hydrated state may be used and such materials are readily found in various chemical handbooks, such as Handbook of Chemistry by Norbert A. Lange, Ninth edition, published by Handbook Publishes, Inc., Sandusky, Ohio, U.S.A., 1956, pages 214 to 333. Examples of the more practical economical salts which may be used include aluminum chloride, hydrated alumina, aluminum sulfate, aluminum ammonium sulfate, ammonium acid phosphite, antimony trichloride, borium citrate, cadmium nitrate, calcium acetate, calcium ammonium phosphate, calcium citrate, calcium metaborate, calcium benzoate, calcium hypochlorite, calcium lactate, calcium nitrate, calcium oxalate, calcium thiosulfate, ferric ammonium oxalate, ferric chloride, ferric nitrate, ferric pyrophosphate, ferric sulfate, magnesium acetate, magnesium ammonium sulfate, magnesium benzoate, magnesium metaborate, magnesium citrate, magnesium chlorate, magnesium potassium chloride, nickel ammonium chloride, nickel ammonium sulfate, nickel chloride, nickel ferrocyanide, nickel sulfate, potassium tetraborate, potassium carbonate, potassium hydrosulfide, potassium hydroxide, sodium carbonate, sodium tetraborate, sodium sesquicarbonate, sodium citrate, sodium dithionate, sodium ferric oxalate, sodium hydroxide, borax, sodium hypophosphate, sodium oxide, sodium perborate, sodium peroxide, sodium phosphate, sodium metasilicate, sodium sulfate, sodium sulfide, sodium tartarate, titanium oxalate, zinc acetate, zinc ammonium sulfate, zinc chloride, zinc chlorate, zinc dithionate, zinc nitrate, etc.

We have not established the mechanism by which the compositions of this invention affect their better properties but we believe that the following explanation is at least possible.

The hydratable compound acts as a water donor to the urea or other deliquescent plasticier component which when in the presence of this water, possibly as a urea-water complex, acts as a plasticizer or softening agent for the polymer component. If the urea is in the system without the hydratable salt, it will soon lose its water through evaporation at low humidities and will crystallize and not function as a plasticizer. On the other hand, the hydratable compound, being stable when hydrated is an aqueous environment and will tend to replenish its water of crystallization from the atmosphere as it is being dehydrated by the urea component. The urea-water complex is probably polymeric and acts as an excellent plasticizer for polymers of vinyl compounds and olefinically unsaturated polycarboxylic monomers such as styrene/maleic anhydride, acid, salt, amide-salt, and ester copolymers and other polar materials.

In addition to the above stated advantages of this invention the application of these polymer, deliquescent plasticizer, and hydratable salt formulations of this invention to cellulosic substrates provides coated paper products having improved non-polar solvent hold properties.

The invention is further illustrated by the following examples which illustrate the enhanced flexibility and compressibility of polymer film formulations of this invention.

Example 1

Three dry free-flowing polymer compositions were compounded and then dissolved in water to provide solutions having about 10 percent total solids content. The three compositions were:

(1) 10 parts of a commercially available dry, free-flowing disodium salt of a styrene/maleic anhydride copolymer having a viscosity of about 40 centipoises in a 3% polymer solids solution in water at 25° C.

(2) 8.4 parts of the same styrene/maleic disodium salt polymer as in (1) above, and 1.68 parts solid urea.

(3) 8.4 parts of the same polymer as in (1) above, 1.68 parts of urea, and 0.336 part of magnesium chloride hexahydrate.

The three dry formulations were then dissolved in sufficient water to provide solutions having about 10% total solids content. The viscosity and pH properties of the resulting solutions, the properties of films cast from the respective solutions, and compressibilities of papers coated with the respective polymer solutions are given in the following table.

TABLE I

|  | Polymer Formulation No. | | |
|---|---|---|---|
|  | 1 | 2 | 3 |
| Solution: | | | |
| Total Solids Content, percent | 10.0 | 10.08 | 10.42 |
| Viscosity at 50° C | 42.8 | 37.2 | 30.8 |
| pH | 7.5 | 7.1 | 7.68 |
| Cast Film—Flexibility at: | | | |
| 70° F, 55% RH [1] | Brittle | (4) | (5) |
| 76° F, 38% RH | Brittle | Brittle | Flexible [2] |
| Compressibility of Coated Paper [3]—Solvent Holdout (number of penetrations): | | | |

|  | Uncal. | Cal. | Uncal. | Cal. | Uncal. | Cal. |
|---|---|---|---|---|---|---|
| After 24 hours at 71° F., 64% RH | 28 | 50+ | 11 | 23 | 3 | 6 |
| After 24 hours at 70° F., 55% RH | 30 | 50+ | 10 | 20 | 5 | 8 |
| After 24 hours at 71° F., 30% RH | 50+ | 50+ | 25 | 50+ | 11 | 7 |

[1] RH means Relative Humidity.
[2] Film sample could be bent 180° without breaking.
[3] In this test coated paper samples were exposed to the enumerated temperature, relative humidity conditions, and then divided into two lots. One lot was tested for toner oil holdout without calendering. The other lot was supercalendered at about 5000 lbs. pressure and then evaluated for toner holdout. The lower number of penetrations indicates the improvement in flexebility and compressibility of the polymer coated paper. The toner oil used is a mixture of aliphatic hydrocarbons having methyl side chains. The doublet system in the infrared spectrum M region shows that

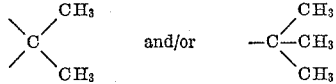

groups are present, and which has a boiling point ranging from 182.5° C. (first drop of distillate) to 211.4° C. (dry point).
[4] Some Flexibility.
[5] Very Flexible.

What is claimed is:

1. A composition comprising (a) a water soluble polymer of a polymerizable vinyl compound and an olefinically unsaturated polycarboxylic acid anhydride, selected from the group consisting of dicarboxylic acid anhydrides and tricarboxylic acid anhydrides having from 4 to 8 carbon atoms, wherein the molar ratio of the polycarboxylic acid anhydride to the vinyl compound is from about 0.90:1 to about 1.8 to 1, and minor proportions relative to the weight of component (a) of (b) a deliquescent plasticizer wherein said plasticizer is an organic amine selected from the group consisting of urea, melamine, and mixtures and derivatives thereof, and (c) an hydratable compound.

2. A composition as described in claim 1 wherein in the polymer (a) the polymerizable vinyl compound moiety is a vinyl monocylic aromatic hydrocarbon having from 8 to 10 carbon atoms, and the olefinically unsaturated polycarboxylic acid anhydride is maleic anhydride, the deliquescent plasticizer (b) is an organic amine selected from the group consisting of urea, melamine, and mixtures and derivatives thereof and the hydratable compound (c) is a salt of an inorganic acid anion and the cation is selected from the group consisting of alkali and alkaline earth metals.

3. A composition as described in claim 2 wherein the polymer (a) is a polymer of styrene and maleic anhydride, component (b) is urea, and component (c) is magnesium chloride.

4. A dry, free-flowing solid composition comprising a major proportion of (a) a dry water soluble styrene/maleic anhydride polymer, having a molar ratio of maleic anhydride to styrene of from about 0.90:1 to about 1.8 to 1, and minor proportions of (b) solid urea, and (c) a solid magnesium chloride salt.

5. A paper web treated with an aqueous composition comprising water having dispersed therein (a) a water soluble polymer of a polymerizable vinyl compound and an olefinically unsaturated polycarboxylic acid anhydride, selected from the group consisting of dicarboxylic acid anhydrides and tricarboxylic acid anhydrides having from 4 to 8 carbon atoms, wherein the molar ratio of the polycarboxylic acid anhydride to the vinyl compound is from about 0.90:1 to about 1.8 to 1, and minor proportions relative to the amount of the polymer (a) of (b) a deliquescent plasticizer wherein said placticizer is an organic amine selected from the group consisting of urea, melamine and mixtures and derivatives thereof, and (c) a hydratable compound, and dried to obtain a web having improved holdout properties.

6. A coated paper web having improved holdout properties comprising a cellulosic paper web having applied to at least one surface thereof an aqueous composition containing (a) a water soluble styrene/maleic copolymer having a molar ratio of maleic anhydride to styrene of from about 0.90:1 to about 1.8 to 1, (b) urea, and (c) a magnesium chloride salt, and dried to remove dispersing water therefrom.

References Cited

UNITED STATES PATENTS 2,607,762    8/1952    Bowen _____ 260—78.5
2,723,195    11/1955    Blake _____ 260—78.5

MORRIS LIEBMAN, *Primary Examiner.*

S. L. FOX, *Assistant Examiner.*